(12) United States Patent
Liu et al.

(10) Patent No.: US 11,570,202 B2
(45) Date of Patent: Jan. 31, 2023

(54) METHOD, DEVICE AND ETHERNET SWITCH FOR AUTOMATICALLY SENSING ATTACK BEHAVIORS

(71) Applicant: The PLA Information Engineering University, Zhengzhou (CN)

(72) Inventors: Qinrang Liu, Zhengzhou (CN); Ke Song, Zhengzhou (CN); Bo Zhao, Zhengzhou (CN); Jianliang Shen, Zhengzhou (CN); Xia Zhang, Zhengzhou (CN); Ting Chen, Zhengzhou (CN); Peijie Li, Zhengzhou (CN); Dongpei Liu, Zhengzhou (CN); Wenjian Zhang, Zhengzhou (CN); Li Zhang, Zhengzhou (CN)

(73) Assignee: THE PLA INFORMATION ENGINEERING UNIVERSITY, Zhengzhou (CN)

( * ) Notice: Subject to any disclaimer, the term of this patent is extended or adjusted under 35 U.S.C. 154(b) by 2 days.

(21) Appl. No.: 17/084,619

(22) Filed: Oct. 29, 2020

(65) Prior Publication Data
US 2021/0336986 A1 Oct. 28, 2021

(30) Foreign Application Priority Data
Apr. 25, 2020 (CN) .......................... 202010335962.8

(51) Int. Cl.
*H04L 9/40* (2022.01)
*H04L 49/351* (2022.01)
*H04L 69/08* (2022.01)

(52) U.S. Cl.
CPC ........ *H04L 63/1441* (2013.01); *H04L 49/351* (2013.01); *H04L 63/0236* (2013.01); *H04L 69/08* (2013.01)

(58) Field of Classification Search
CPC ..... H04L 63/10; H04L 63/14; H04L 63/1416; H04L 63/1491; H04L 63/1433;
(Continued)

(56) References Cited

U.S. PATENT DOCUMENTS 10,394,798 B1 * 8/2019 Holenstein .......... G06F 16/2365
2014/0189867 A1 * 7/2014 Jung .................. H04L 63/1458
726/23
(Continued)

*Primary Examiner* — Dustin Nguyen
(74) *Attorney, Agent, or Firm* — Matthias Scholl P.C.; Matthias Scholl

(57) ABSTRACT

A method for automatically sensing attack behaviors, the method including: distributing a service request from a network switch to a response module, where the response module includes a main controller configured for data interaction processing and an auxiliary controller configured for interactive data processing; generating, by the main controller and the auxiliary controller in the response module, respective response data according to the service request, respectively; and comparing the respective response data of the main controller with the respective response data of the auxiliary controller; if a result of comparison is inconsistent, indicating the network switch is abnormal, an administrator is informed, and the response data generated by the auxiliary controller is fed back to the network switch; and, if the result of comparison is consistent, the response data generated by the main controller is fed back to the network switch.

4 Claims, 3 Drawing Sheets

(58) Field of Classification Search
CPC ..... H04L 63/1441; H04L 41/00; H04L 43/18; H04L 45/021; H04L 47/2458; H04L 63/1425; H04L 63/1458; G06F 16/2365; G06F 21/566; G06F 21/577; H04W 4/70
See application file for complete search history.

(56) References Cited

U.S. PATENT DOCUMENTS

| | | | |
|---|---|---|---|
| 2015/0188937 A1* | 7/2015 | Wu | H04L 63/1416 726/22 |
| 2016/0164840 A1* | 6/2016 | Robertson | H04L 63/10 726/12 |
| 2016/0269432 A1* | 9/2016 | Lin | H04L 43/18 |
| 2017/0078313 A1* | 3/2017 | Zhong | H04L 45/021 |
| 2017/0078323 A1* | 3/2017 | Ross | H04L 63/1441 |
| 2017/0149825 A1* | 5/2017 | Gukal | H04L 63/1491 |
| 2017/0244745 A1* | 8/2017 | Key | H04L 63/1433 |
| 2017/0357801 A1* | 12/2017 | Sanchez | G06F 21/577 |
| 2019/0149573 A1* | 5/2019 | Park | H04L 41/00 726/22 |
| 2019/0158521 A1* | 5/2019 | Juliato | H04L 63/1425 |
| 2020/0053567 A1* | 2/2020 | Monshizadeh | H04W 4/70 |
| 2020/0099722 A1* | 3/2020 | Wu | H04L 63/14 |
| 2021/0243224 A1* | 8/2021 | Mahmoud | H04L 63/1416 |
| 2021/0306362 A1* | 9/2021 | Kubo | H04L 47/2458 |

\* cited by examiner

METHOD, DEVICE AND ETHERNET SWITCH FOR AUTOMATICALLY SENSING ATTACK BEHAVIORS

CROSS-REFERENCE TO RELAYED APPLICATIONS

Pursuant to 35 U.S.C. § 119 and the Paris Convention Treaty, this application claims foreign priority to Chinese Patent Application No. 202010335962.8 filed on Apr. 25, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the technical field of network security, and more particularly to a method, device and Ethernet switch for automatically sensing attack behaviors.

Ethernet switches are widely applied in the network as node devices. The security of the Ethernet switches affects the security of the network space. The existing methods for enhancing the security of switches mainly comprise flow control, layer filtering, fully utilizing the log function or using encrypted login methods such as secure shell (SSH), restricting login address, lock synchronization, and unified log management; or the network security is enhanced by classifying virtual local area network (VLAN), setting the access control list, using NetFlow, enhancing security authentication and enhancing port security. These methods may roughly restrict the access of illegal users, increase the attacking difficulty of illegal users, disable unnecessary services and improve log management. However, the attacks towards the switches are not fully solved. Even if the antivirus software with an attack identification function is installed on the switches, the software resources are limited and difficult to update. Moreover, the above measures are accompanied by restrictions, that is, they can only defend known attack methods or attack behaviors with known attack characteristics but cannot identify attacks based on unknown vulnerabilities or backdoors.

SUMMARY

The disclosure provides a method for automatically sensing attack behaviors, the method comprising:
  distributing a service request from a network switch to a response module, where the response module comprises a main controller configured for data interaction processing and an auxiliary controller configured for interactive data processing, both the main controller and the auxiliary controller being of a heterogeneous equivalent controller structure;
  generating, by the main controller and the auxiliary controller in the response module, respective response data according to the service request, respectively; and
  comparing the respective response data of the main controller with the respective response data of the auxiliary controller; if a result of comparison is inconsistent, indicating the network switch is abnormal, an administrator is informed, and the response data generated by the auxiliary controller is fed back to the network switch; and, if the result of comparison is consistent, the response data generated by the main controller is fed back to the network switch.

In a class of this embodiment, the main controller and the auxiliary controller comprise different CPUs, different operating systems and protocol stack software to form heterogeneous equivalent controller structures.

In a class of this embodiment, the main controller is configured for normal data interaction processing; the auxiliary controller is configured to receive distributed data consistent with that of the main controller and respond to the distributed data, and during the interactive data processing, the auxiliary controller is in an invisible state where the auxiliary controller is isolated from the network switch.

The disclosure also provides a device for automatically sensing attack behaviors, the device comprising a distribution module, a response module and a sensing module.

The distribution module is configured to distribute a service request from a network switch to the response module, the response module comprising a main controller configured for data interaction processing and an auxiliary controller configured for interactive data processing, both the main controller and the auxiliary controller being of a heterogeneous equivalent controller structure.

The response module is configured to generate respective response data by using the main controller and the auxiliary controller according to the service request, respectively.

The sensing module is configured to compare the respective response data generated by the main controller and the auxiliary controller; if a result of comparison is inconsistent, determine that the network switch is abnormal, inform an administrator, and feed back the response data generated by the auxiliary controller to the network switch; and, if the result of comparison is consistent, feed back the response data generated by the main controller to the network switch.

In a class of this embodiment, the main controller and the auxiliary controller comprise different CPUs, different operating systems and protocol stack software to form heterogeneous equivalent controller structures.

In another aspect, the disclosure provides an Ethernet switch, comprising:
  a switching chip configured to forward data;
  a main controller configured to receive service request data distributed by the switching chip in a normal data interaction state and respond to the service request data;
  an auxiliary controller configured to receive service request data distributed by the switching chip in an invisible state and respond to the service request data, both the main controller and the auxiliary controller being of a heterogeneous equivalent controller structure; and
  a comparator configured to distribute the service request data from the switching chip to the main controller and the auxiliary controller, to compare response data of the main controller and the auxiliary controller, and further to forward data and/or inform an administrator according to a result of comparison.

In a class of this embodiment, the main controller and the auxiliary controller comprise different CPUs, different operating systems and protocol stack software to form heterogeneous equivalent controller structures.

In a class of this embodiment, the main controller is configured for normal data interaction processing; the auxiliary controller is configured to receive the distributed data consistent with that of the main controller and respond to the distributed data, and during the interactive data processing, the auxiliary controller distributes data through the comparator and is always in an invisible state where the auxiliary controller is isolated from the switching chip.

The disclosure also provides a server, comprising: a processor; and, a storage device comprising a program that, when executed by the processor, enables the processor to implement the method for automatically sensing attack behaviors.

Also provided is a computer-readable medium comprising a program that, when executed by a processor, implements the method for automatically sensing attack behaviors.

DETAILED DESCRIPTION

Figure 1:
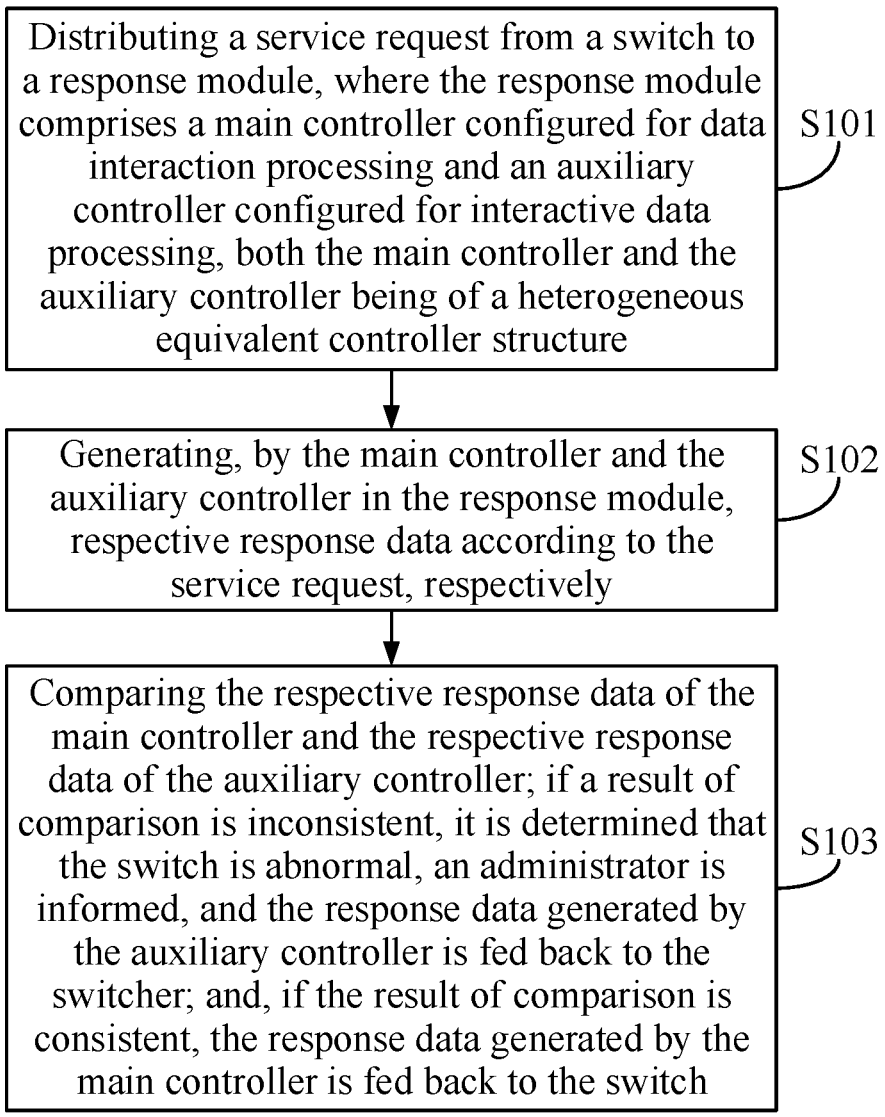
FIG. 1 is a flowchart of a method for automatically sensing attack behaviors according to one embodiment of the disclosure.
Figure 2:
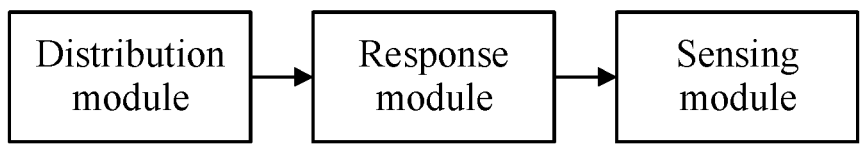
FIG. 2 is a schematic diagram of a device for automatically sensing attack behaviors according to one embodiment of the disclosure.

To further illustrate the disclosure, embodiments detailing a method, device and Ethernet switch for automatically sensing attack behaviors are described below. It should be noted that the following embodiments are intended to describe and not to limit the disclosure.

In the related art, the technologies used to improve the security of Ethernet switches can only defend attacks based on prior knowledge, that is, they can only identify and defend known attack methods or attack behaviors with known attack characteristics. When an attacker changes the data characteristics or flow characteristics in an attack flow or uses a new attack path that is unknown to a defender, the existing defense systems and defense measures will be failed. Particularly, the vulnerability is an inevitable problem in the design of software and hardware systems, and the backdoor is an unavoidable problem in the process of using non-autonomous controllable devices and components. When the attacker makes an attack by using an unrevealed vulnerability or backdoor, the defense system designed by the defender is useless and cannot effectively identify and defend attack behaviors and attack data. Hence, with reference to FIG. 1, the disclosure provides a method for automatically sensing attack behaviors, the method comprising:

S101: distributing a service request from a network switch to a response module, where the response module comprises a main controller configured for data interaction processing and an auxiliary controller configured for interactive data processing, both the main controller and the auxiliary controller being of a heterogeneous equivalent controller structure;

S102: generating, by the main controller and the auxiliary controller in the response module, respective response data according to the service request, respectively; and S103: comparing the respective response data of the main controller with the respective response data of the auxiliary controller; if a result of comparison is inconsistent, indicating the network switch is abnormal, an administrator is informed, and the response data generated by the auxiliary controller is fed back to the network switch; and, if the result of comparison is consistent, the response data generated by the main controller is fed back to the network switch.

By responding to the same service request by two heterogeneous controllers with equivalent functions and then automatically sensing and identifying the abnormality of a network switch according to the response results of the two controllers, the method of the disclosure is scientific and reasonable. No matter what mode an attack uses or whether an attack can be identified by conventional security measures, the attacked state of the network switch is successfully identified by comparing the response data and then reported to an administrator, so that the abnormality of the controller of the network switch is automatically identified. The method is efficient, fast and easy to implement.

Further, the main controller and the auxiliary controller comprise different CPUs, different operating systems and protocol stack software to form heterogeneous equivalent controller structures. Each controller comprises CPU-centered hardware, and software such as an operating system, a protocol stack and management software. The two heterogeneous equivalent controllers are identical in function, i.e., generating the same output for the same input; however, they are different in hardware and software, i.e., comprising different CPUs, different operating systems and protocol stack software, so that effective attack methods, Trojans or viruses can only take effect on the main controller but not on the auxiliary controller. When the main controller is attacked, the attack is ineffective for the auxiliary controller due to different hardware and software environments, and the attacked state of the main controller is identified by comparing outputs and then processed by the administrator.

Further, the main controller is configured for normal data interaction processing; and, the auxiliary controller is configured to receive the distributed data consistent with that of the main controller and respond to the distributed data, and during the interactive data processing, the auxiliary controller is in an invisible state where the auxiliary controller is isolated from the network switch. When the network switch is attacked or controller by an attacker, the network switch will try to issue an instruction to add an item to a forwarding table. After the instruction reaches a comparator, since the auxiliary controller does not output this instruction, the result of comparison is inconsistent. Then, it is determined according to the result of comparison that the network switch is abnormal and the abnormality is reported to the administrator and processed by the administrator. This solution is simple and easy to implement.

Figure 3:
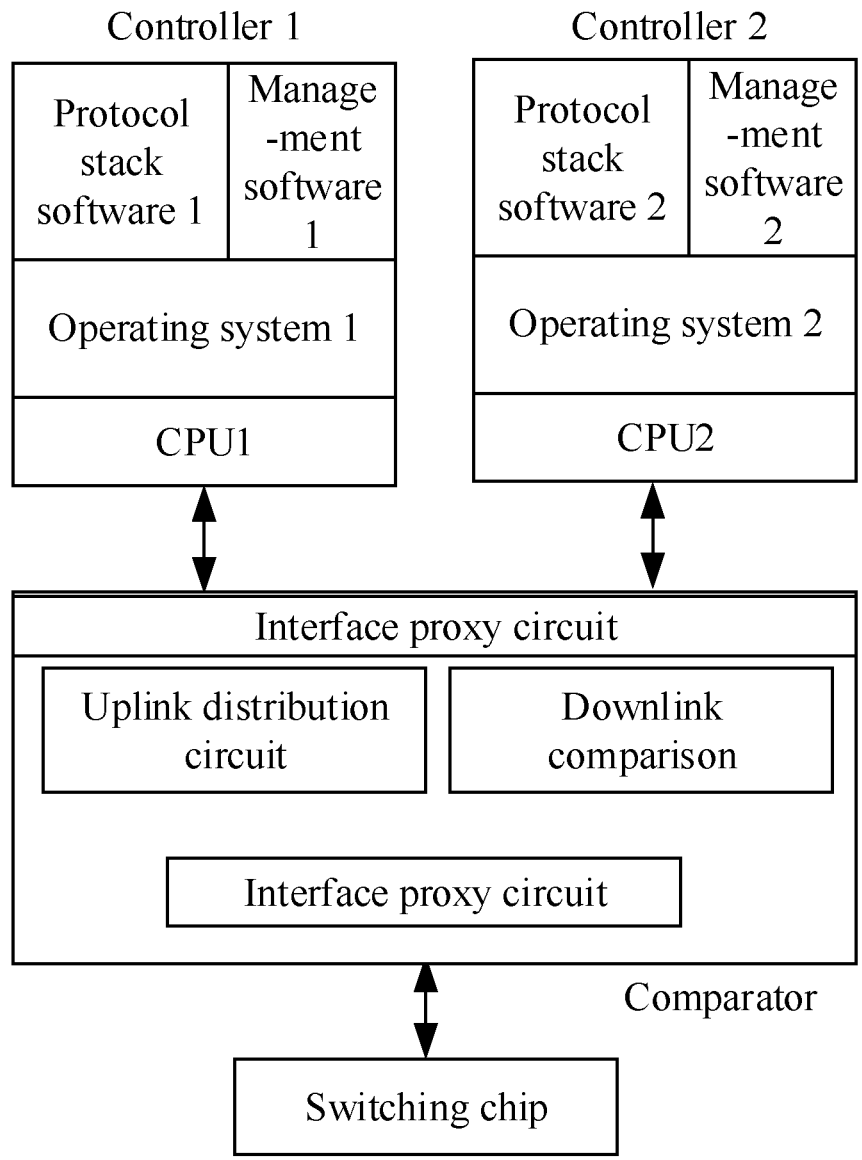
FIG. 3 is a first structure diagram of a network switch according to one embodiment of the disclosure.

Further, the disclosure provides a device for automatically sensing attack behaviors, as shown in FIG. 3, comprising a distribution module, a response module and a sensing module.

The distribution module is configured to distribute a service request from a network switch to the response module, the response module comprising a main controller configured for data interaction processing and an auxiliary controller configured for interactive data processing, both the main controller and the auxiliary controller being of a heterogeneous equivalent controller structure.

The response module is configured to generate respective response data by using the main controller and the auxiliary controller according to the service request, respectively.

The sensing module is configured to compare the response data generated by the main controller and the auxiliary controller; if the result of comparison is inconsistent, determine that the network switch is abnormal, inform an administrator, and feed back the response data generated by the auxiliary controller to the network switch; and, if the result of comparison is consistent, feed back the response data generated by the main controller to the network switch.

By responding to the same service request by two heterogeneous controllers with equivalent functions and then automatically sensing and identifying the abnormality of a network switch according to the response results of the two controllers, the solution is easy to implement.

Further, the main controller and the auxiliary controller comprise different CPUs, different operating systems and protocol stack software to form heterogeneous equivalent controller structures. The two heterogeneous equivalent controllers are identical in function, i.e., generating the same output for the same input; however, they are different in hardware and software, i.e., comprising different CPUs, different operating systems and protocol stack software, so that it is convenient to effectively identify and defend attack behaviors.

Further, the disclosure provides an Ethernet switch for automatically sensing attack behaviors, the Ethernet switch comprising:

a switching chip configured to forward data;

a main controller configured to receive service request data distributed by the switching chip in a normal data interaction state and respond to the service request data;

an auxiliary controller configured to receive service request data distributed by the switching chip in an invisible state and respond to the service request data, both the main controller and the auxiliary controller being of a heterogeneous equivalent controller structure; and a comparator configured to distribute the service request data from the switching chip to the main controller and the auxiliary controller, to compare response data of the main controller and the auxiliary controller, and further to forward data and/or inform an administrator according to a result of comparison.

As shown in FIGS. 1 and 3, the switching chip is connected to the comparator, and the comparator is connected to a plurality of controllers. The switching chip realizes the data forwarding function of the switch, comprising layer 2 forwarding, layer 3 forwarding, searching and deciding a forwarding table, message processing, forwarding data scheduling or the like. The switching chip can send a service request to the comparator and expect to receive a service response. For example, the switching chip can forward a network protocol control message to the comparator and expect the comparator to issue a forwarding table item; or, the switching chip can forward an administrator control and management request message to the comparator and expect the comparator to feed back a control and management response message or the like.

Further, the main controller and the auxiliary controller comprise different CPUs, different operating systems and protocol stack software to form heterogeneous equivalent controller structures.

Further, the main controller is configured for normal data interaction processing; the auxiliary controller is configured to receive the distributed data consistent with that of the main controller and respond to the distributed data, and during the interactive data processing, the auxiliary controller distributes data through the comparator and is always in an invisible state where the auxiliary controller is isolated from the switching chip. Thus, effective attack methods, Trojans or viruses can only take effect on the main controller but not on the auxiliary controller. When the main controller is attacked, the attack is ineffective for the auxiliary controller due to different hardware and software environments, and the attacked state of the main controller is identified by comparing outputs and then processed by the administrator. The controllers receive the service request from the comparator and feed back service responses. Each controller comprises CPU-centered hardware, and software such as an operating system, a protocol stack and management software. Meanwhile, the two controllers should be identical in function, i.e., generating the same output for the same input; however, the two controllers should be different in hardware and software, i.e., comprising different CPUs, different operating systems and protocol stack software. The comparator uploads and distributes the service function request from the switching chip to the two controllers. The output data from the first controller is output to the switching chip. The outputs from the two controllers are compared, and the result of comparison is reported to the administrator. During the distribution by the comparator, when the switching chip has a service request, the service request is received and then distributed to the two controllers, and the data distributed to the two controllers is identical. When the comparator compares the response data, the service response outputs from the two online controllers are received. If the outputs are identical, indicating that the first controller is in a normal state and the network switch is not attacked; and, if the outputs are different, indicating that the network switch may be in an attacked state. The comparator issues the output from the first controller to the switching chip during the issuing process, so the network switch presents only the first controller to outsides, and the attacker cannot know the information of the second controller. Thus, the attack methods, Trojans or viruses that are effective to the first controller can only take effect on this controller but not on the second controller. When the first controller is successfully attacked, the attack is ineffective to the second controller due to different hardware and software environments, and the attacked state of the first controller is identified by comparing outputs and processed by the administrator.

Figure 4:
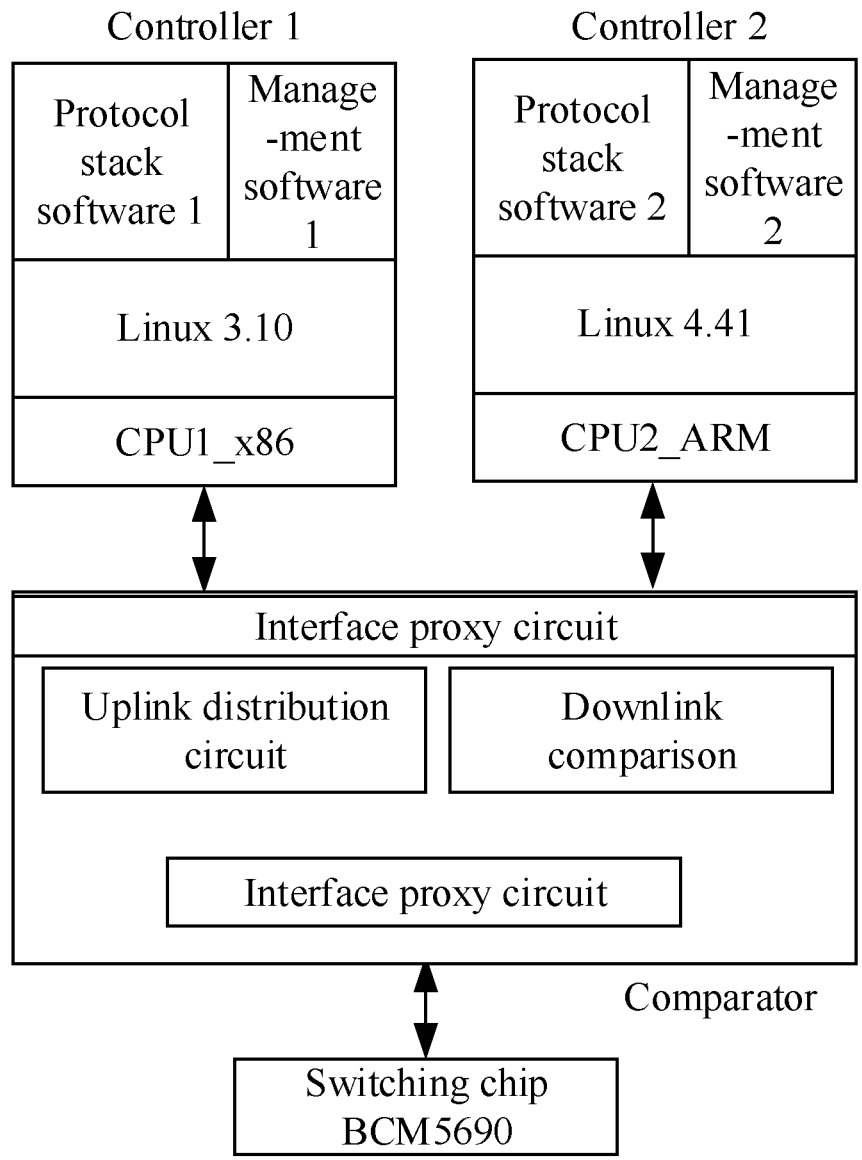
FIG. 4 is a second structure diagram of the network switch according to another embodiment of the disclosure.

In one embodiment, the function and operating mode of the switching chip in the network switch may be identical to that of the switching chip in the common commercial Ethernet switch. As shown FIG. 4, a commercially-available switching chip is used. The comparator is implemented by the Virtex XC7VX690T FPGA chip from the Xilinx Company. The controllers are two CPU sub-cards, and the CPUs adopt x86 and ARM architectures respectively and are configured with a 2 GB DDR memory and a 16 GB Flash storage space. The operating systems are kernel version 3.10 and kernel version 4.41 of Linux, respectively; and the protocol software and the management software are obtained by performing diversified compilation on source codes. After the network switch is powered on, the first controller and the second controller operate normally. The comparator copies and distributes, to the two controllers, the service request uploaded by the switching chip, and issues the output from the first controller to the switching chip. When the first controller is in a normal state, the outputs from the two controllers are identical, and the result of comparison of the comparator is consistent. When the first controller is attacked and controlled by the attacker, the first controller tries to issue, to the switching chip, an instruction to add an item to a forwarding table. After the instruction reaches the comparator, since the second controller does not output this instruction, the result of comparison is inconsistent. The result of comparison is reported to the administrator and processed by the administrator. It can be known that the attacked state of the first controller is successfully identified by comparison. No matter what mode the attack uses or whether the attack can be identified by conventional security measures, the attack will be identified by the disclosure. The network switch of the disclosure can automatically identify the attack to the controllers of the network switch and report the attack to the administrator, ensuring that the operating state of the network switch is always controlled.

Unless otherwise specified, the relative steps, numerical expressions and numerical values of the components and steps described in these embodiments are not intended to limit the scope of the disclosure.

The disclosure further provides a server, comprising: one or more processors; and, a storage device comprising one or more programs that, when executed by the one or more processors, enable the one or more processors to implement the method for automatically sensing attack behaviors.

The disclosure further provides a computer-readable medium comprising a program that, when executed by a processor, implements the method for automatically sensing attack behaviors.

The flowcharts and block diagrams in the drawings show the architectures, functions and operations that are possibly implemented by the system, system and computer program product according to various embodiments of the present disclosure. In this regard, each block in the flowcharts or block diagrams may represent a module, a program segment or a part of a code, which comprises one or more executable instructions for implementing the specified logical function. In some alternative implementations, the functions marked in the blocks may occur in an order different from that marked in the drawings. For example, two successive blocks may actually be executed substantially concurrently, or may sometimes be executed in a reverse order, depending upon the functions involved. Optionally, each block in the block diagrams and/or flowcharts and combination of blocks in the block diagrams and/or flowcharts may be implemented by special purpose hardware-based systems that perform the specified functions or acts, or the combination of special purpose hardware and computer instructions.

In certain embodiments provided in the disclosure, it should be understood that the disclosed system, device and system may be implemented in other ways. The embodiments of the device described above are merely illustrative. For example, the division of units is merely a logical functional division, and other division modes may be used during actual implementations. For another example, multiple units or components may be combined or integrated into another system, or some features may be ignored or not executed. On the other hand, the coupling or direct coupling or communicative connection shown or discussed herein may be indirect coupling or communicative connection between devices or units through some communication interfaces, or may be electrical, mechanical or in other forms.

In addition, the functional units in the embodiments of the disclosure may be integrated into one processing module; or, each unit may physically exist alone; or, two or more units may be integrated into one module.

If the functions are implemented in form of software functional units or sold or used as independent products, the functions may be stored in a non-volatile computer-readable storage medium that can be executed by a processor. Based on this understanding, the technical solutions of the disclosure may be essentially embodied in form of software products, or some of the technical solutions that contribute to the prior art or some of the technical solutions may be embodied in form of software products. The computer software products are stored in a storage medium, and comprise a number of instructions to enable a computer device (which may be personal computer, a server, a network device or the like) to execute all or some of the steps in the system according to various embodiments of the disclosure. The above-mentioned storage medium comprises: U disks, mobile hard disks, ROMs (read-only memories), RAMs (random access memories), magnetic disks, optical disks, or various mediums that can store program codes.

It will be obvious to those skilled in the art that changes and modifications may be made, and therefore, the aim in the appended claims is to cover all such changes and modifications.

What is claimed is:

1. A method of controlling a network switch for automatically sensing network attack, comprising:
   distributing a service request from a switching chip to a response module, where the response module comprises a main controller configured for data interaction processing and an auxiliary controller configured for interactive data processing, both the main controller and the auxiliary controller being of a heterogeneous equivalent controller structure;
   generating, by the main controller and the auxiliary controller in the response module, respective response data according to the service request, respectively; and
   comparing the respective response data of the main controller with the respective response data of the auxiliary controller; if a result of comparison is inconsistent, indicating the switching chip is abnormal, an administrator is informed, and the response data generated by the auxiliary controller is fed back to the switching chip; and, if the result of comparison is consistent, the response data generated by the main controller is fed back to the switching chip;
   wherein
   the switching chip, the main controller, and the auxiliary controller are disposed in the network switch;
   the main controller and the auxiliary controller comprise different CPUs, different operating systems, and different protocol stack software to form the heterogeneous equivalent controller structure; and
   the main controller is configured for normal data interaction processing; the auxiliary controller is configured to receive distributed data consistent with that of the main controller and respond to the distributed data, and during the interactive data processing, the auxiliary controller is in an invisible state where the auxiliary controller is isolated from the switching chip.

2. A network switch device for automatically sensing network attack, comprising:
   a distribution module, a response module and a sensing module, wherein:
   the distribution module is configured to distribute a service request from a switching chip to the response module, the response module comprising a main controller configured for data interaction processing and an auxiliary controller configured for interactive data processing, both the main controller and the auxiliary controller being of a heterogeneous equivalent controller structure;
   the response module is configured to generate respective response data by using the main controller and the auxiliary controller according to the service request, respectively; and
   the sensing module is configured to compare the respective response data generated by the main controller and the auxiliary controller; if a result of comparison is inconsistent, determine that the switching chip is abnormal, inform an administrator, and feed back the response data generated by the auxiliary controller to the switching chip; and, if the result of comparison is consistent, feed back the response data generated by the main controller to the switching chip;

wherein the switching chip, the main controller, and the auxiliary controller are disposed in the network switch device;

the main controller and the auxiliary controller comprise different CPUs, different operating systems, and different protocol stack software to form the heterogeneous equivalent controller structure; and the main controller is configured for normal data interaction processing; the auxiliary controller is configured to receive distributed data consistent with that of the main controller and respond to the distributed data, and during the interactive data processing, the auxiliary controller is in an invisible state where the auxiliary controller is isolated from the switching chip.

3. An Ethernet switch for automatically sensing network attack, comprising:

a switching chip configured to forward data;

a main controller configured to receive service request data distributed by the switching chip in a normal data interaction state and respond to the service request data;

an auxiliary controller configured to receive service request data distributed by the switching chip in an invisible state and respond to the service request data, both the main controller and the auxiliary controller being of a heterogeneous equivalent controller structure; and a comparator configured to distribute the service request data from the switching chip to the main controller and the auxiliary controller, to compare response data of the main controller and the auxiliary controller, if a result of comparison is inconsistent, indicating the switching chip is abnormal, an administrator is informed, and the response data generated by the auxiliary controller is fed back to the switching chip; and, if the result of comparison is consistent, the response data generated by the main controller is fed back to the switching chip;

wherein the switching chip, the main controller, and the auxiliary controller are disposed in the Ethernet switch;

the main controller and the auxiliary controller comprise different CPUs, different operating systems, and different protocol stack software to form the heterogeneous equivalent controller structure; and the main controller is configured for normal data interaction processing; the auxiliary controller is configured to receive the distributed data consistent with that of the main controller and respond to the distributed data, and during the interactive data processing, the auxiliary controller distributes data through the comparator and is always in an invisible state where the auxiliary controller is isolated from the switching chip.

4. A server, comprising: a processor; and, a storage device comprising a program that, when executed by the processor, enables the processor to implement the method of claim 1.

* * * * *